United States Patent [19]

Winberg

[11] Patent Number: 5,338,903
[45] Date of Patent: Aug. 16, 1994

[54] COMBINATION MUFFLER AND CATALYTIC CONVERTER

[75] Inventor: James R. Winberg, Brookfield, Wis.

[73] Assignee: Briggs & Stratton Corporation, Wauwatosa, Wis.

[21] Appl. No.: 154,154

[22] Filed: Nov. 17, 1993

Related U.S. Application Data

[63] Continuation of Ser. No. 752,763, Aug. 30, 1991, abandoned.

[51] Int. Cl.$^5$ .................................................. F01N 3/00
[52] U.S. Cl. .................................. 181/231; 181/258
[58] Field of Search ............. 181/229, 231, 232, 240, 181/252, 254, 256, 258, 272, 282, 262, 263, 237, 255; 60/299, 308

[56] References Cited

U.S. PATENT DOCUMENTS

| | | | |
|---|---|---|---|
| 1,575,657 | 3/1926 | Straussler | 181/258 |
| 1,793,813 | 2/1931 | MacKinnon | 60/302 |
| 3,106,821 | 10/1963 | Ridgway | 60/293 |
| 3,116,596 | 1/1964 | Boehme et al. | 60/307 |
| 3,124,930 | 3/1964 | Powers | 60/302 |
| 3,247,665 | 4/1966 | Behrens | 60/302 |
| 3,247,666 | 4/1966 | Behrens | 60/302 |
| 3,314,230 | 4/1967 | Vanderpoel | 60/293 |
| 3,498,054 | 3/1970 | Theed | 60/290 |
| 3,595,015 | 7/1971 | Kretschmer | 60/308 |
| 3,653,212 | 4/1972 | Gast et al. | |
| 3,656,915 | 4/1972 | Tourtellotte | 60/308 |
| 3,775,064 | 11/1973 | Berger et al. | 60/290 |
| 3,963,444 | 6/1976 | Yamada et al. | 60/299 |
| 3,981,145 | 9/1976 | Noguchi et al. | 60/302 |
| 4,032,310 | 6/1977 | Ignoffo | 181/258 |
| 4,050,903 | 9/1977 | Bailey et al. | 60/299 |
| 4,085,586 | 4/1978 | Shibata | 60/293 |
| 4,094,644 | 6/1978 | Wagner | |
| 4,165,611 | 8/1979 | Ishikawa | 60/293 |
| 4,180,975 | 1/1980 | Takagi et al. | 60/290 |
| 4,188,783 | 2/1980 | Sayo et al. | 60/302 |
| 4,209,493 | 6/1980 | Olson | |
| 4,218,422 | 8/1980 | Schock et al. | 60/307 |
| 4,354,349 | 10/1982 | Otani et al. | 181/232 |
| 4,444,725 | 4/1984 | Feaster | 60/308 |
| 4,457,895 | 7/1984 | Prigent | 60/299 |
| 4,579,194 | 4/1986 | Shiki et al. | 181/231 |
| 4,830,833 | 5/1989 | Shaff | 60/308 |
| 4,867,270 | 9/1989 | Wissmann et al. | 181/231 |
| 4,890,690 | 1/1990 | Fischer et al. | 60/299 |
| 4,894,987 | 1/1990 | Harwood et al. | 181/282 X |
| 4,972,921 | 11/1990 | Takada et al. | 181/282 |
| 5,043,147 | 8/1991 | Knight | 181/232 X |

FOREIGN PATENT DOCUMENTS

| | | |
|---|---|---|
| 8807068 | 5/1988 | Fed. Rep. of Germany . |
| 4017267 | 12/1990 | Fed. Rep. of Germany . |
| 2214323 | 9/1974 | France . |
| 1456025 | 11/1976 | United Kingdom . |

Primary Examiner—Michael L. Gellner
Assistant Examiner—Khanh Dang
Attorney, Agent, or Firm—Andrus, Sceales, Starke & Sawall

[57] ABSTRACT

A combination muffler and catalytic converter for an exhaust system of a small internal combustion engine. The catalytic converter is mounted within a chamber formed inside the muffler which functions not only to contain the catalytic converter but also to provide sound attenuation. The combination muffler/catalytic converter also includes an assembly for introducing secondary air into the interior of the muffler body containing the catalytic converter so that harmful uncombusted components such as hydrocarbons, carbon monoxide and nitrous oxides contained in the exhaust gases are further combusted prior to exiting the muffler. The secondary air supply assembly includes an opening formed in the muffler body which communicates between the interior of the muffler body and atmosphere, and a reed valve mounted directly on the muffler body adjacent this opening. The reed valve is operable in response to exhaust gas pressure pulsations within the muffler between a normally closed position which seals the opening and an open position which unseals the opening to permit atmospheric air to flow into the interior of the muffler body.

10 Claims, 3 Drawing Sheets

COMBINATION MUFFLER AND CATALYTIC CONVERTER

This application is a continuation of application Ser. No. 07/752,763, filed Aug. 30, 1991, now abandoned.

BACKGROUND OF THE INVENTION

The present invention relates to an exhaust system for an internal combustion engine, and more particularly to a combination muffler and catalytic converter for two or four cycle engines of the type having one or two cylinders and to a secondary air supply system utilizing a reed valve mounted directly on the combination muffler/catalytic converter.

In order to reduce harmful hydrocarbons, carbon monoxide and nitrous oxide components in exhaust gas, it is known to utilize a catalytic converter containing an oxidizing catalyzer disposed in the exhaust system of the engine upstream of a muffler. It is also known to feed secondary air into the exhaust system upstream of the catalytic converter for promoting oxidation of un-burned hydrocarbons, carbon monoxide and nitrous oxide components in the exhaust gas to thereby reduce the expelling of such harmful hydrocarbon, carbon monoxide and nitrous oxide components into the atmosphere.

The secondary air supply system generally comprises one of two different designs. The first type is a rotary air pump such as a belt driven vane pump mounted to a conventional internal combustion engine to inject compressed air into the exhaust manifold of the engine by way of an air injection manifold. Alternately, it has also been proposed to utilize exhaust gas pulsation in the exhaust manifold of muli-cylinder, e.g. eight cylinder, automobile engines for injecting secondary air into the exhaust system upstream of a catalytic converter. In particular, it is known to utilize atmospheric air as the secondary air to be introduced upstream of a catalytic converter in the exhaust system by using a reed type check valve which is operated by the action of exhaust pressure pulsation generated in the exhaust manifold. The air pump has the advantage that it is capable of supplying any variable quantity of secondary air into the exhaust system while the system employing exhaust gas pulsation to produce the pumping action has the advantage that the supply of secondary air is obtained by a relatively simple and inexpensive structure.

SUMMARY OF THE INVENTION

A muffler for a two or four cycle internal combustion engine of the type having one or two cylinders has a catalytic converter combined with the muffler itself. The catalytic converter is mounted within the muffler body in the path of the exhaust gases. Preferably, the catalytic converter is mounted within a chamber formed with perforated walls so that the chamber functions not only to contain the catalytic converter but also to provide sound attenuation.

In another aspect of the invention, the muffler includes an assembly for introducing secondary air into the interior of the muffler body containing a catalytic converter so that harmful uncombusted components such as hydrocarbons, carbon monoxide and nitrous oxides contained in the exhaust gases are further combusted prior to exiting the muffler. The secondary air supply assembly preferably includes an opening formed in the muffler body which communicates between the interior of the muffler body and atmosphere, and a reed valve mounted directly on the muffler body adjacent to this opening. The reed valve is operable in response to exhaust gas pressure pulsations within the muffler body between a normally closed position which seals the opening and an open position which unseals the opening to permit atmospheric air to flow into the interior of the muffler body.

The present invention thus provides a simple and economical combination muffler/catalytic converter for an internal combustion engine. The secondary air supply system mounts directly on the muffler and therefore does not add any appreciable volume or add any appreciable weight to the engine. Also, the air supply system is self actuating, that is, it is operable by exhaust gas pulsations in the muffler to produce a pumping action and therefore does not reduce engine power as would prior art belt driven air pumps. Therefore, this system does not require any external mechanical or electrical energy source.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
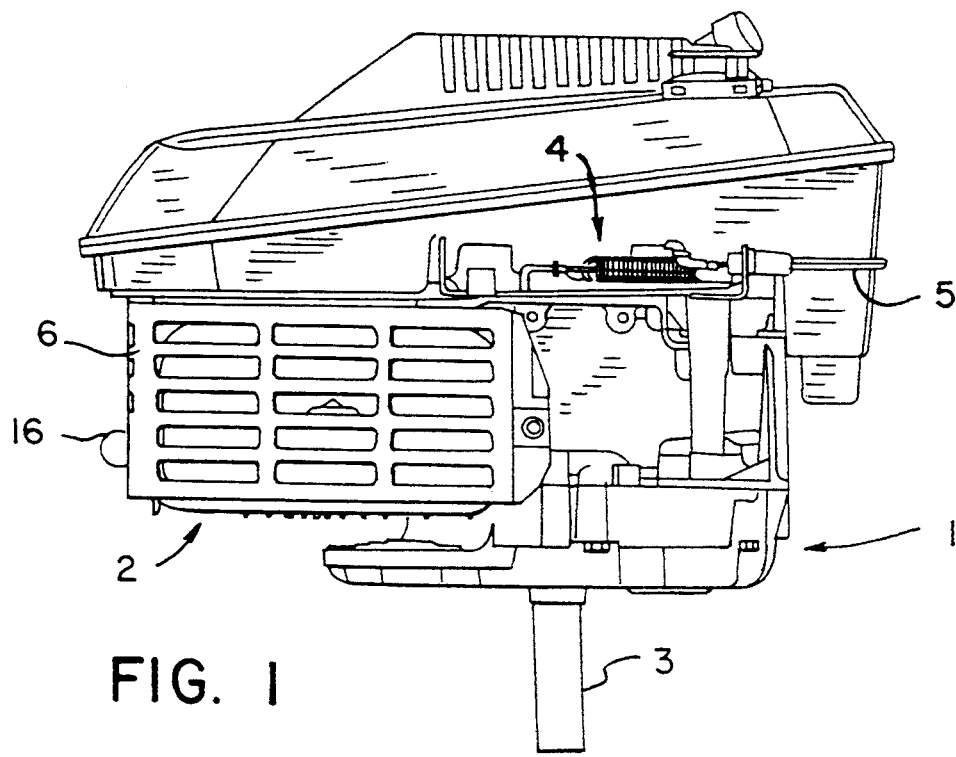
FIG. 1 is a side view in elevation of an internal combustion engine incorporating a muffler assembly constructed in accordance with the principles of the present invention.

Referring now to the drawings, FIG. 1 illustrates an internal combustion engine generally designated by the numeral 1 incorporating a muffler 2 in accordance with the present invention. As illustrated, engine 1 is of a relatively low horse power type, i.e less than 20 horsepower having one or two cylinders, which might typically be utilized in connection with lawn and garden equipment such as lawnmowers, rotor tillers, generators, pumps and the like. Engine 1 includes a crankshaft 3 conventionally powered by a piston and cylinder arrangement (not shown) and whose speed is controlled by a throttle mechanism generally designated by the numeral 4. The throttle mechanism includes a control cable 5 which typically leads to a bale and handle assembly (not shown) utilized by an operator to control the speed of the engine and the operation of the device. As illustrated, a guard 6 encloses muffler 2 to aid in preventing an operator from touching the hot metal muffler body during operation.

Figure 2:
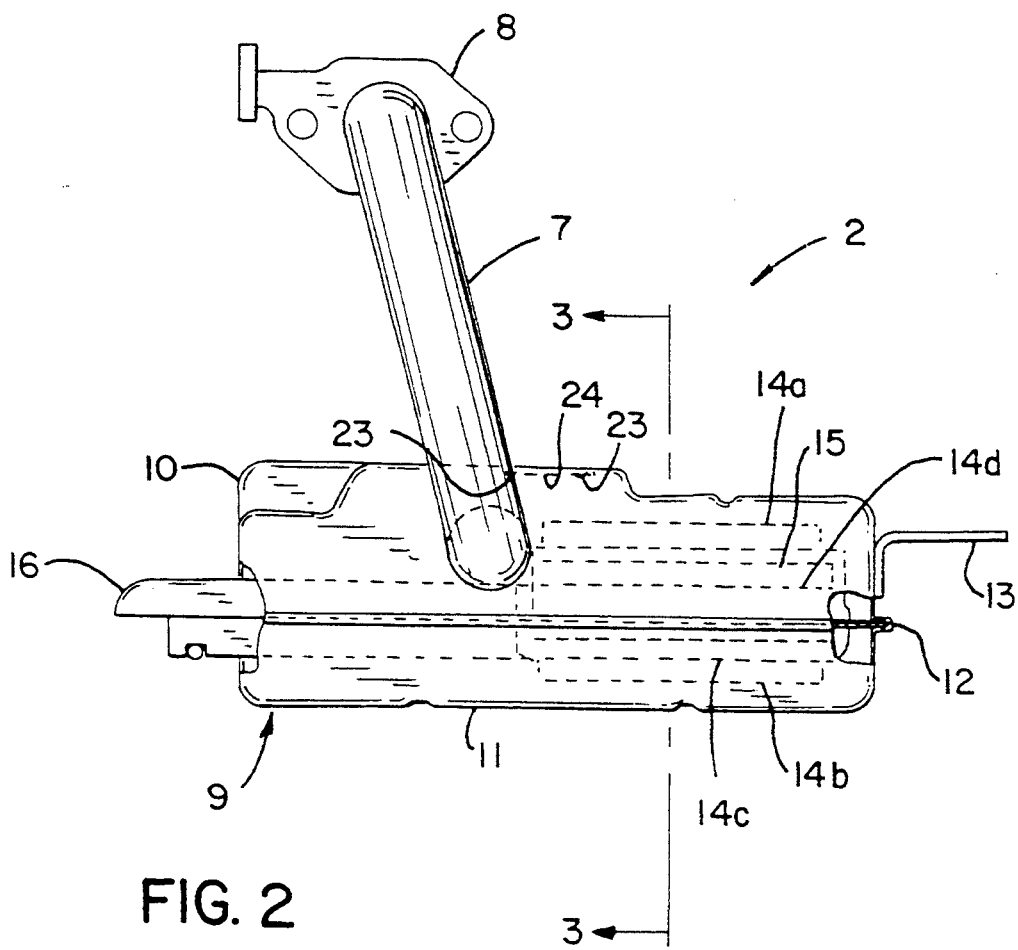
FIG. 2 is a top view of the muffler assembly.
Figure 3:
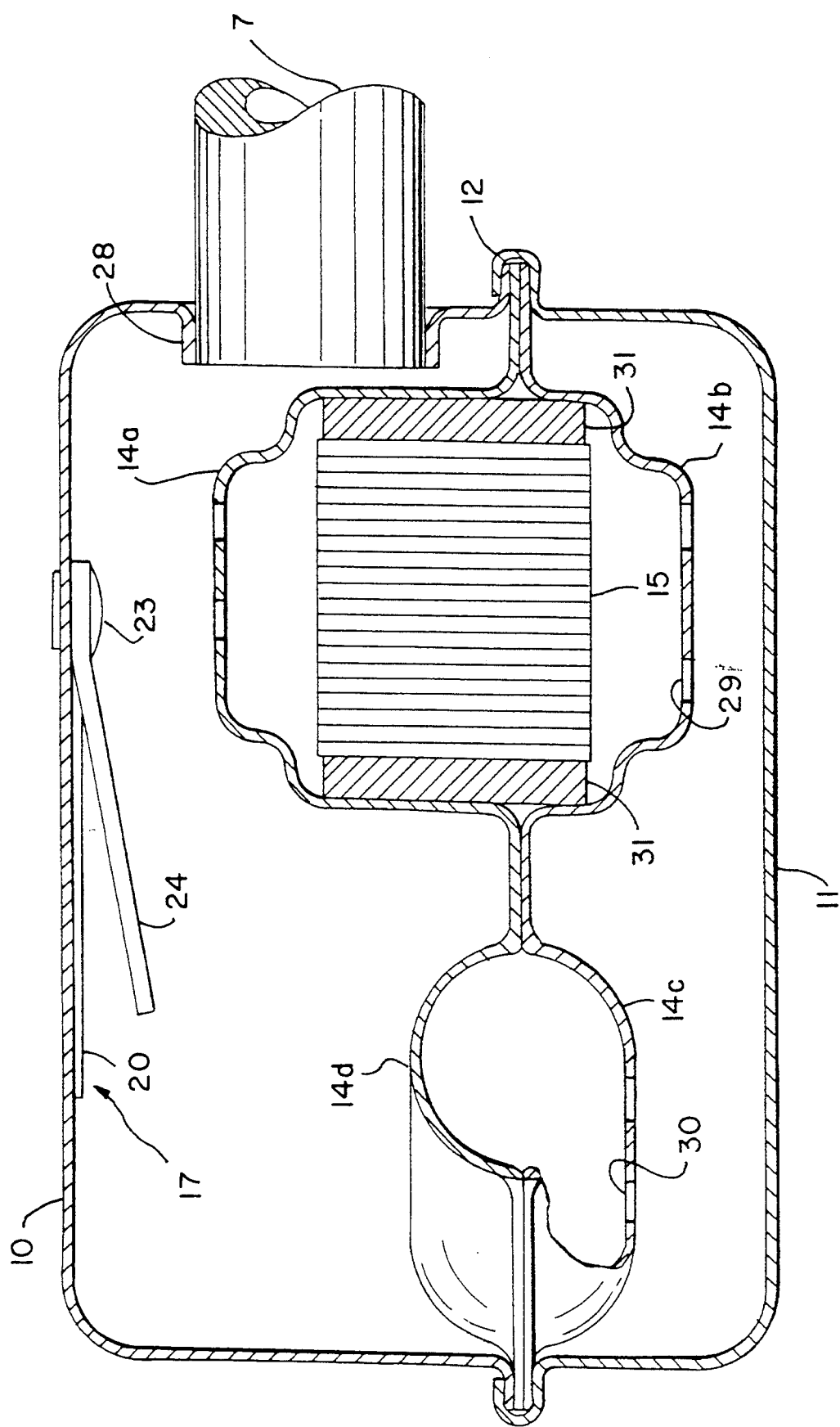
FIG. 3 is a cross sectional view taken along the plane of the line 3—3 in FIG. 2.

Referring now to FIGS. 2 and 3, there is illustrated in more detail muffle assembly 2. Muffler assembly 2 includes an exhaust tube 7 connected at one end by means of an integral flange 8 to the exhaust outlet from the cylinder head (not shown) of engine 1. The opposite end of tube 7 is connected to a muffler 9 which is comprised of a two-piece hollow housing including a cup-shaped body 10 and cover 11 which are secured together by means of a circumferential clinch or crimp 12. A bracket 13 is utilized to mount muffler 9 to the engine block. Muffler 9 includes a series of perforated metal walls 14a, 14b and 14c and a solid wall 14d opposite wall 14c that form two separate chambers 29 and 30 for sound attenuation purposes. As shown best in FIG. 3, a collar 28 projecting into the interior of body 10 is employed for guiding and attaching tube 7 to muffler 9.

As shown best in FIGS. 2 and 3, a catalytic converter 15 is mounted in chamber 29 within muffler 9 downstream of the inlet of tube 7 into the interior of muffler 9 but upstream from the outlet 16 of muffler 9. Converter 15 is surrounded by a packing material 31 which functions as a temperature insulating and vibration isolating means. All exhaust gas entering the interior of muffler 9 first passes downwardly through wall 14a into the first chamber 29 containing converter 15 in order to oxidize components such as hydrocarbons, carbon monoxide and nitrous oxide. In order to accomplish this, catalytic converter 15 is in the form of a honeycombed ceramic structure. The structure is appropriately sized for the engine displacement and emission reduction desired, and as illustrated in FIG. 2 is dimensioned approximately 3 inches by 1 inch by 1 inch for the 5 horsepower engine 1 illustrated in FIG. 1. The ceramic structure is coated with an oxidizing and reducing catalyzer of any known composition. Preferably, a combination of platinum, palladium an rhodium is utilized. However, any combination of known oxidizing and reducing catalyzer material may be employed. After passing through converter 15, the exhaust gas exits the first chamber 29 through wall 14b, then enters the second chamber 30 through wall 14c, and finally exits muffler 9 through outlet 16.

Figure 4:
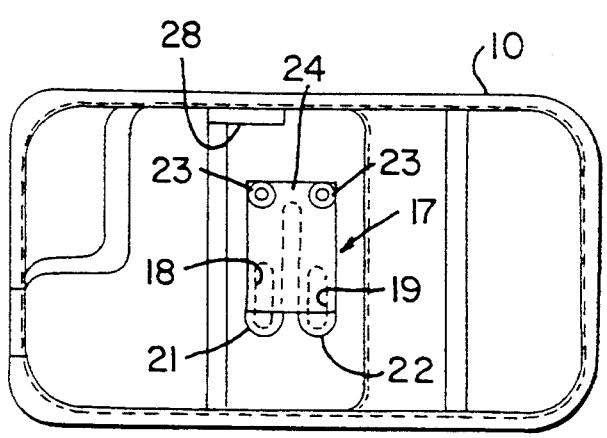
FIG. 4 is a plan view illustrating the interior of the muffler body.
Figure 5:
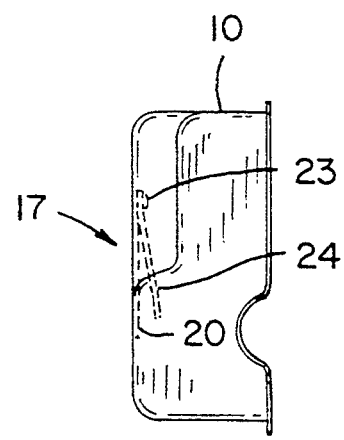
FIG. 5 is a side view of the muffler body of FIG. 4.

As is well known in the art, in order to further oxidize unburned exhaust gas components such as hydrocarbons, carbon monoxide and nitrogen oxides in a catalytic converter, there must be supplied additional air to the catalytic converter. In order to accomplish this, FIGS. 4–5 illustrate a reed valve assembly generally designated by the numeral 17. Reed valve assembly 17 includes a pair of feed openings 18 and 19 formed through body 10 of muffler 9 so that the interior of muffler 9 communicates with atmosphere. As shown best in FIG. 4, openings 18 and 19 are substantially oblong in shape and disposed parallel and adjacent to one another. However, other specific arrangements may be employed such as a single opening as opposed to two openings, and the specific locations and dimensions for these openings may be modified from that which is illustrated in FIG.4. Reed valve assembly 17 also includes a reed valve 20 having a pair of tongue men, hers 21 and 22 cooperating with air openings 18 and 19 respectively. Reed valve 20 is comprised of thin elastic tempered metal or the like and is fastened at one end by a pair of rivets 23 to the inside surface of body 10. A stop 24 in the form of a thin metal plate is also mounted via rivets 23 to body 10 and as shown in FIG. 5 is angled slightly away from the interior wall of body 10. Stop 24 functions to prevent excessive flexing of reed valve 20, as will hereinafter be described.

Figure 6:
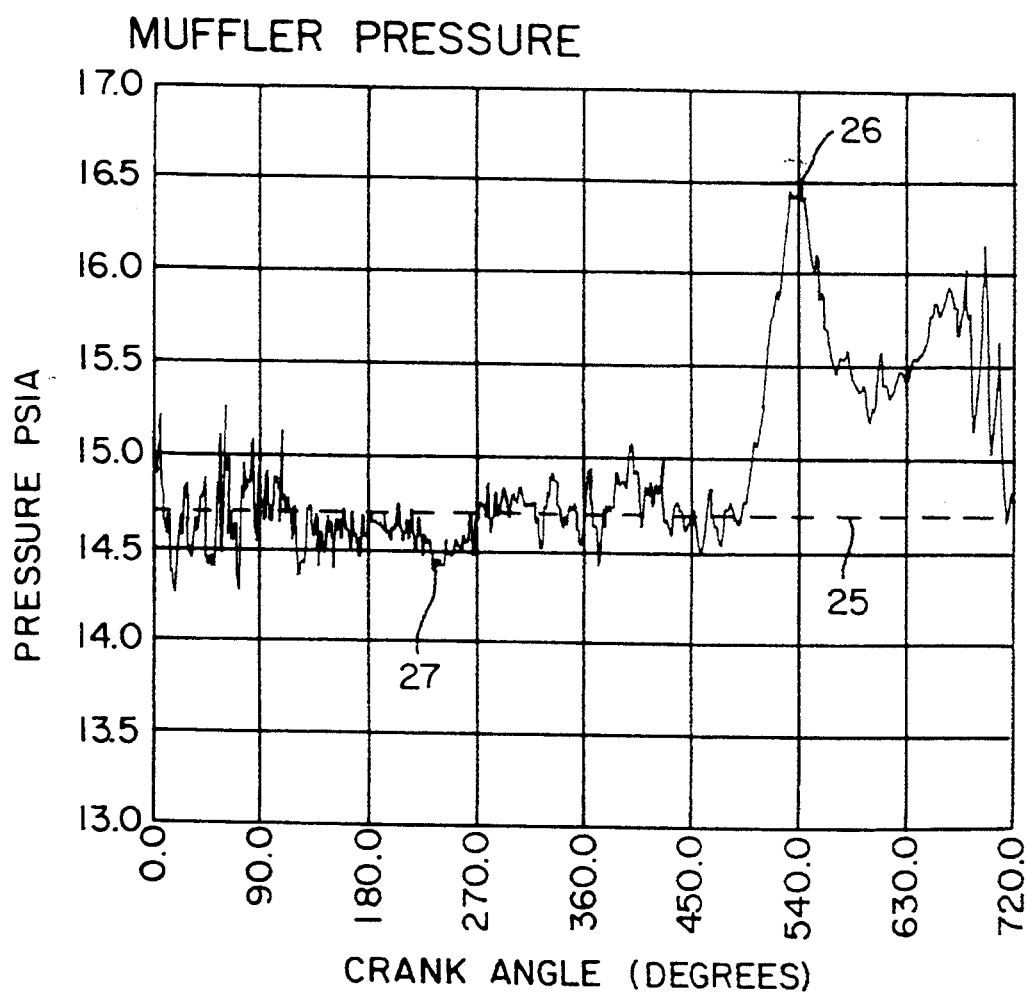
FIG. 6 is a graph of muffler pressure over time as shown by the angle of the crankshaft of the engine.

FIG. 6 illustrates a graph of muffler pressure over time as determined by the crankshaft angle of engine 1. Dashed line 25 in FIG. 6 is representative of atmospheric pressure, namely, 14.7 pounds per square inch. Peak 26 is representative of the opening of the exhaust valve (not shown) in engine 1. Finally, peaks such as those illustrated at 27 are representative of a negative pressure in muffler 9 since these peaks are below atmospheric pressure line 25. As a result, the areas illustrated below line 25 in FIG. 6 will cause reed valve 20 to open as they are representative of negative pressure in muffler 9 whereas areas above line 25 in FIG. 6 will result in the closing of reed valve 20 as these are representative of pressures above atmospheric. Thus, when closed, reed valve 20 prevents exhaust leaks from muffler 9.

In operation, reed valve 20 is flexed or opened to unseal air openings 18 and 19 during those times when the pressure within muffler 9 is below atmospheric i.e. below line 25 in FIG. 6. During these times, secondary air from the atmosphere passes through air openings 18 and 19 into the interior of muffler 9 to aid in the oxidation of exhaust gas components such as carbon monoxide, oxides of nitrogen and various other hydrocarbons prior to their discharge from outlet 16. On the other hand, reed valve 20 is closed thus sealing openings 18 and 19 to prevent exhaust leaks from muffler 9 whenever the pressure within muffler 9 is above line 25 in FIG. 6. Thus, reed valve 20 is in a constant state of movement to permit secondary air into muffler 9 at various times during one complete rotation of the crankshaft of engine 1. There is thus provided a simple and economical combination muffler/catalytic converter structure and means for supplying secondary air to catalytic converter 15.

Various modes of carrying out the invention are contemplated as being within the scope of the following claims particularly pointing out and distinctly claiming the subject matter regarded as the invention.

I claim:

1. A muffler for an exhaust system of a one or two cylinder internal combustion engine, comprising:
   a hollow muffler body having an exhaust gas inlet connected to the exhaust system of a one or two cylinder engine, and an exhaust gas outlet;
   partition means disposed transversely within said muffler body for dividing said muffler body into a first chamber communicating with said exhaust gas inlet and a second chamber communicating with said exhaust gas outlet, said partition means defining a third chamber having an upstream end opening to said first chamber and a downstream end opening to said second chamber, said upstream end including gas distribution means for uniformly distributing exhaust gases from said first chamber into said third chamber, said gas distribution means comprises a perforated wall portion;
   a catalytic converter including a catalyzer disposed within said third chamber for oxidizing and reducing unburned exhaust gas components prior to said components discharge into said second chamber and from said exhaust gas outlet;
   a secondary air supply means mounted within said muffler body, said secondary air supply means operable in response to exhaust gas pressure within said first chamber between a normally closed position and an open position which permits atmospheric air to flow into said first chamber within the interior of said muffler body, and said secondary air supply means includes an opening formed in said muffler body communicating between atmosphere and said first chamber, and valve means mounted within said first chamber operable to open and close said opening.

2. A muffler for an exhaust system of a one or two cylinder internal combustion engine, comprising:
- a hollow muffler body having an exhaust gas inlet connected to the exhaust system of a one or two cylinder engine, and an exhaust gas outlet;
- partition means disposed transversely within said muffler body for dividing said muffler body into a first chamber communicating with said exhaust gas inlet and a second chamber communicating with said exhaust gas outlet, said partition means defining a third chamber having an upstream end opening to said first chamber and a downstream end opening to said second chamber, said upstream end including gas distribution means for uniformly distributing exhaust gases from said first chamber into said third chamber, said gas distribution means comprises a perforated wall portion;
- a catalytic converter including a catalyzer disposed within said third chamber for oxidizing and reducing unburned exhaust gas components prior to said components discharge into said second chamber and from said exhaust gas outlet;
- a secondary air feed opening formed in said muffler body which communicates between atmosphere and said first chamber; and
- a reed valve mounted on an internal surface of said muffler body within said first chamber adjacent said secondary air feed opening and operable in response to exhaust gas pressure within said first chamber between a normally closed position which seals said opening and an open position which unseals said opening to permit atmospheric air to flow into said first chamber within the interior of said muffler body.

3. The muffler of claim 2 wherein there are two secondary air feed openings and said reed valve simultaneously seals and unseals both of said openings.

4. The muffler of claim 3 wherein said secondary air feed openings are located closely adjacent one another, and said reed valve includes a pair of tongue members with one of said tongue members cooperating with one of said openings and the other of said tongue members cooperating with the other of said openings.

5. A muffler for an exhaust system of one or two cylinder internal combustion engine, comprising;
- a hollow muffler body having an exhaust gas inlet connected to the exhaust system of a one or two cylinder engine, and an exhaust gas outlet;
- partition means disposed transversely within said muffler body for dividing said muffler body into a first chamber communicating with said exhaust gas inlet and a second chamber communicating with said exhaust gas outlet, said partition means defining a sound attenuation chamber having an upstream end opening to said first chamber and a downstream end opening to said second chamber, said upstream end including gas distribution means for uniformly distributing exhaust gases from said first chamber into said sound attenuation chamber, said gas distribution means comprises a perforated wall portion;
- a catalytic converter including a catalyzer disposed within said sound attenuation chamber for oxidizing and reducing unburned exhaust gas components prior to said components discharge into said second chamber and from said exhaust gas outlet; and
- a secondary air supply means mounted within said muffler body, said secondary air supply means operable in response to exhaust gas pressure within said first chamber between a normally closed position and an open position which permits atmospheric air to flow into said first chamber within the interior of said muffler body, and said secondary air supply means includes an opening formed in said muffler body communicating between atmosphere and said first chamber, and valve means mounted within said first chamber operable to open and close said opening.

6. The muffler of claim 5 wherein said valve means comprises a reed valve mounted on an internal surface of said muffler body within said first chamber.

7. A muffler for an exhaust system of an internal combustion engine, comprising:
- a hollow muffler body having an exhaust gas inlet connected to the exhaust system of the engine, and an exhaust gas outlet, said muffler body including a cup-shaped body and cover;
- partition means disposed transversely within said muffler body for dividing said muffler body into a first chamber communicating with said exhaust gas inlet and a second chamber communicating with said exhaust gas outlet, said partition means defining a third chamber having an upstream end opening to said first chamber and a downstream end opening to said second chamber, said upstream end including gas distribution means for uniformly distributing exhaust gases from said first chamber into said third chamber, said gas distribution means comprises a perforated wall portion;
- a catalytic converter including a catalyzer disposed within said third chamber for oxidizing and reducing unburned exhaust gas components prior to said components discharge into said second chamber and from said exhaust gas outlet; and mounting means for securing said cup-shaped body and cover together, said mounting means further securing said partition means such that said body, cover and partition means are all rigidly secured together by said same mounting means.

8. The muffler of claim 7 wherein said partition means comprises a first wall disposed back-to-back with a second wall, said first and second walls defining a peripheral mounting flange.

9. The muffler of claim 8 wherein said muffler body and cover each include a mounting flange and the peripheral mounting flange of said first and second partition walls is sandwiched therebetween.

10. The muffler of claim 9 wherein said mounting means comprises a crimp formed by one of the mounting flanges of said body and cover.

* * * * *